(12) United States Patent
Sishtla

(10) Patent No.: US 6,932,190 B2
(45) Date of Patent: Aug. 23, 2005

(54) SOUND JACKET FOR NOISE REDUCTION IN REFRIGERATION APPARATUS

(75) Inventor: Vishnu M. Sishtla, Manlius, NY (US)

(73) Assignee: Carrier Corporation, Syracuse, NY (US)

( * ) Notice: Subject to any disclaimer, the term of this patent is extended or adjusted under 35 U.S.C. 154(b) by 0 days.

(21) Appl. No.: 10/629,417

(22) Filed: Jul. 29, 2003

(65) Prior Publication Data

US 2005/0022548 A1 Feb. 3, 2005

(51) Int. Cl.$^7$ .............................. E04B 1/82; H02K 5/24; G10K 11/16
(52) U.S. Cl. ........................ 181/290; 181/202; 181/205
(58) Field of Search .................. 181/290, 294, 181/200, 202, 205, 403, 287

(56) References Cited

U.S. PATENT DOCUMENTS

| | | | | |
|---|---|---|---|---|
| 2,949,975 A | * | 8/1960 | Plummer ...................... 181/230 |
| 3,589,971 A | * | 6/1971 | Reed ........................... 181/200 |
| 3,881,569 A | * | 5/1975 | Evans, Jr. .................... 181/200 |
| 4,168,726 A | * | 9/1979 | Klennert ..................... 138/96 R |
| 4,258,821 A | * | 3/1981 | Wendt et al. ............... 181/202 |
| 4,442,585 A | * | 4/1984 | McGehee et al. ............ 29/432 |
| 4,615,411 A | * | 10/1986 | Breitscheidel et al. ...... 181/224 |
| 4,879,847 A | * | 11/1989 | Butzen et al. ............... 451/344 |
| 4,892,413 A | * | 1/1990 | Vats ............................ 366/349 |
| 5,169,025 A | * | 12/1992 | Guo ............................ 220/739 |
| 5,272,285 A | * | 12/1993 | Miller ......................... 181/202 |
| 5,274,200 A | * | 12/1993 | Das et al. .................... 181/202 |
| 5,432,306 A | * | 7/1995 | Pfordresher ................. 181/198 |
| 5,622,662 A | * | 4/1997 | Veiga et al. ................ 264/45.3 |
| 5,921,420 A | * | 7/1999 | Gordon et al. ............... 220/1.5 |
| 6,033,756 A | * | 3/2000 | Handscomb ................. 181/293 |
| 6,036,047 A | * | 3/2000 | Dobbie .................. 220/592.03 |
| 6,152,259 A | * | 11/2000 | Freist et al. ................. 181/290 |
| 6,302,466 B1 | * | 10/2001 | Zwick ........................ 296/39.3 |
| 6,722,466 B1 | * | 4/2004 | Tong et al. .................. 181/200 |
| 6,766,879 B2 | * | 7/2004 | Eilers .......................... 181/200 |
| 2002/0108807 A1 | * | 8/2002 | Murakami et al. .......... 181/204 |

FOREIGN PATENT DOCUMENTS

WO    WO 93/19291    * 9/1993 .......... F02M/35/12

* cited by examiner

Primary Examiner—Edgardo San Martin
(74) Attorney, Agent, or Firm—Bachman & LaPointe, P.C.

(57) ABSTRACT

An insulating jacket for refrigeration system component comprising a closed cell insulation layer comprising an inner and outer surface, an open cell foam layer comprising an inner and outer surface, the inner surface in contact with the outer surface of the closed cell insulation layer, and a sound barrier layer comprising an inner surface in contact with the outer surface of the open cell foam layer.

10 Claims, 3 Drawing Sheets

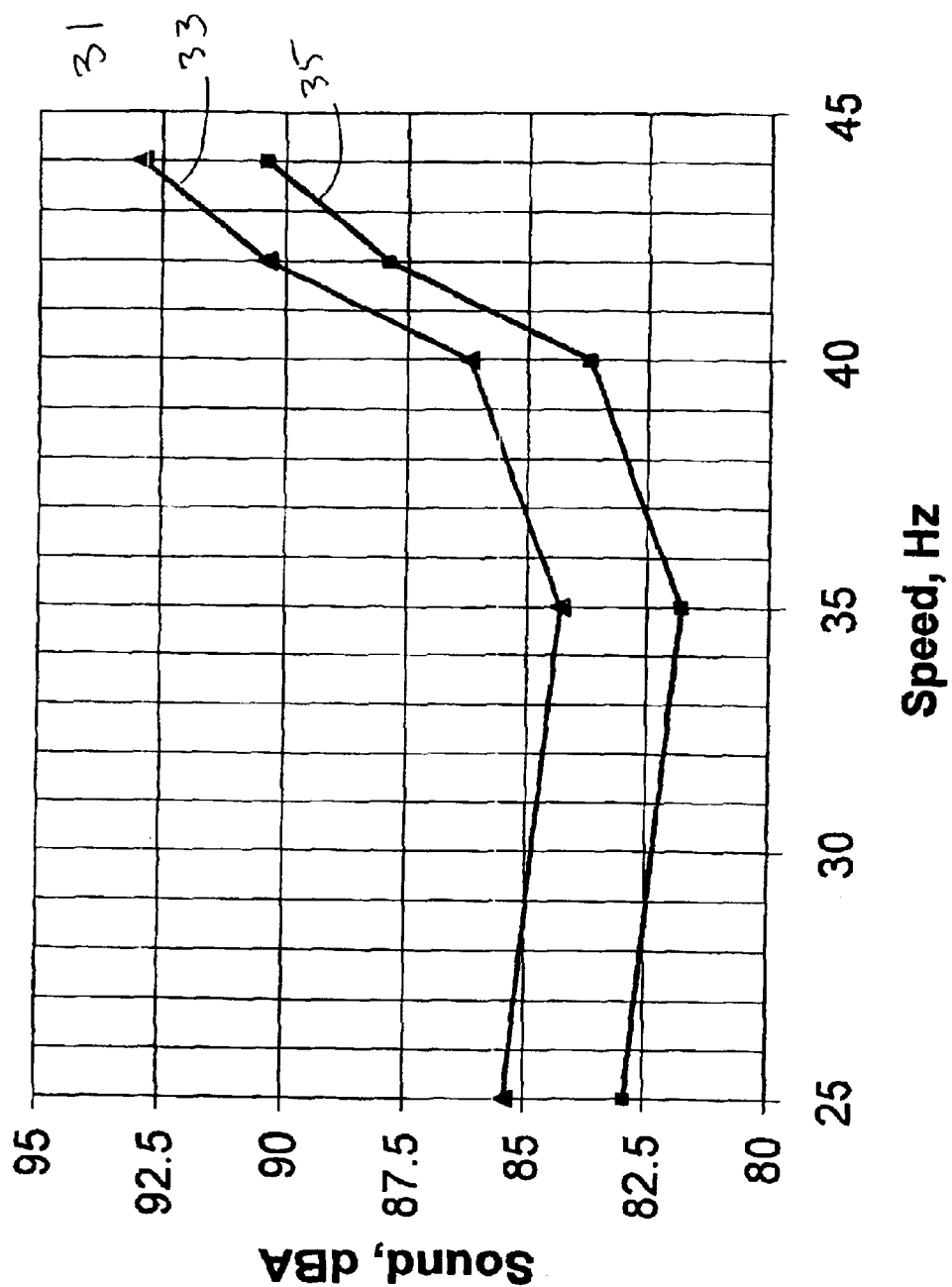

SOUND JACKET FOR NOISE REDUCTION IN REFRIGERATION APPARATUS

BACKGROUND OF THE INVENTION (1) Field of the Invention

The present invention relates to an insulated sound jacket for reducing noise transmission in refrigerator components.

(2) Description of Related Art

Water cooled chillers for use in air conditioning and refrigeration equipment are required to meet stringent noise level requirements, such as those prescribed by OSHA. Screw chillers with low oil flow tend to be very noisy. The primary source of noise generation in screw chillers is the screw compressor. In addition to the screw compressor, there is a multitude of secondary sources of noise, such as the cooler, the condenser, and the economizer.

Noise generated by the aforementioned sources is propagated either by gas or by structure. By introducing a muffler, gas borne noise transmitted to a secondary structure is reduced. However, to reduce the structure borne noise, the mass and stiffness of the vessels need to be changed. Such modification of the structure of the vessels is expensive and can affect the performance and manufacturability of the vessels.

What is therefore needed is an apparatus capable of achieving a high reduction in noise level in secondary sources. It would further be preferable if the apparatus for reducing the noise level could additionally serve as a thermal barrier for the vessel.

SUMMARY OF THE INVENTION

Accordingly, it is an object of the present invention to provide an insulated sound jacket for reducing noise transmission in refrigerator components.

It is a further object of the present invention to provide an insulating jacket for a refrigeration system component which comprises a closed cell insulation layer comprising an inner and outer surface, an open cell foam layer comprising an inner and outer surface, the inner surface in contact with the outer surface of the closed cell insulation layer, and a sound barrier layer comprising an inner surface in contact with the outer surface of the open cell foam layer.

It is a further object of the present invention to provide an insulating jacket which comprises an open cell foam layer comprising an inner surface in contact with a vessel and an outer surface, and a sound barrier comprising an inner surface in contact with the outer surface of the open cell foam layer.

BRIEF DESCRIPTION OF THE DRAWINGS

FIG. 3 is a graph illustrating an acoustic diminution arising from use of a sound jacket of the present invention.

DETAILED DESCRIPTION OF THE PREFERRED EMBODIMENT(S)

It is therefore a central object of the present invention to teach the construction of a sound jacket for reducing the noise in secondary structures such as coolers, condensers and economizers. More specifically, the sound jacket of the present invention is a multilayered apparatus constructed to engage in contact with a vessel so as to both reduce noise propagation and to act as a thermal barrier on the vessel.

Figure 1:
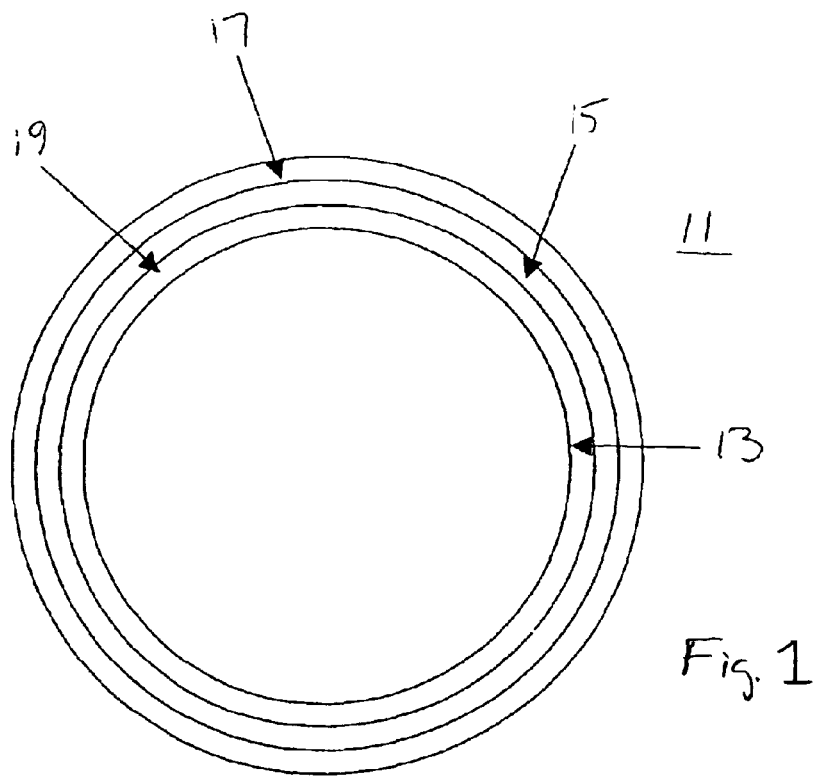
FIG. 1 is a cross-section illustration of a preferred embodiment of the insulating jacket of the present invention.

With reference to FIG. 1, there is illustrated a cross-section of the sound jacket 11 of the present invention surrounding a vessel 13. Preferably, vessel 13 is comprised of a compressor, a cooler or an economizer of a refrigeration unit. In the embodiment illustrated, sound jacket 11 is comprised of three layers. A first layer is comprised of closed cell thermal insulation, thus forming the closed cell insulation layer 19. Closed cell insulation layer 19 is preferably glued to the vessel 13. The thermal insulation from which closed cell insulation layer 19 is constructed serves to reduce the heat transfer from ambient to the low temperature cooler comprising the vessel 13.

A preferably prefabricated combination of open cell foam and a sound barrier encloses, and, is located in contact with, the outer surface of closed cell insulation layer 19. The sound barrier is used to reduce sound transmitted to the ambient. The open cell foam forming open cell foam layer 15 is preferably glued onto the sound barrier forming a sound barrier layer 17 which is formed of a mass of specific density ~1.5 lb/sq. ft. In one embodiment, closed cell insulation layer 19 is glued in contact with open cell foam layer 15 which is itself attached to sound barrier layer 17 such that the entire assembly comprising sound jacket 11 may be glued to vessel 13.

As illustrated, the closed cell insulation layer 19, the open cell foam layer 15, and the sound barrier layer 17 are formed as generally cylindrical sheaths which may be placed one within another such that at least one surface forming the outer or inner surface of each layer 19, 15, 17 is in contact with at least one other surface of one other layer 19, 15, 17.

When a vessel is surrounded by the sound jacket 11 of the present invention comprised of the closed cell insulation layer 19 in contact with the open cell foam layer 15 which is in contact with the sound barrier layer 17, there exists both a reduction in the noise transmitted from the vessel to ambient as well as an increase in the thermal insulation provided to the vessel.

The theory of operation underlying the sound jacket 11 of the present invention is as follows. The vibrating cylinder comprising the vessel 13 sets the closed cell insulation layer 19 in motion. The air or gas trapped in the closed cell foam comprising closed cell insulation layer 19 and the open cell foam comprising open cell foam layer 15 also vibrate and dissipate the vibration induced mechanical energy as heat. It is of note that both closed cell insulation layer 19 and open cell foam layer 15 exhibit low stiffness, and as such, act as a decoupler between the sound barrier layer 17 and the vessel 13. It is the purpose of the sound barrier layer 17 to reflect sound waves back and forth between the sound barrier layer 17 and the vessel 13 thereby increasing the dissipation of sound energy.

Figure 2:
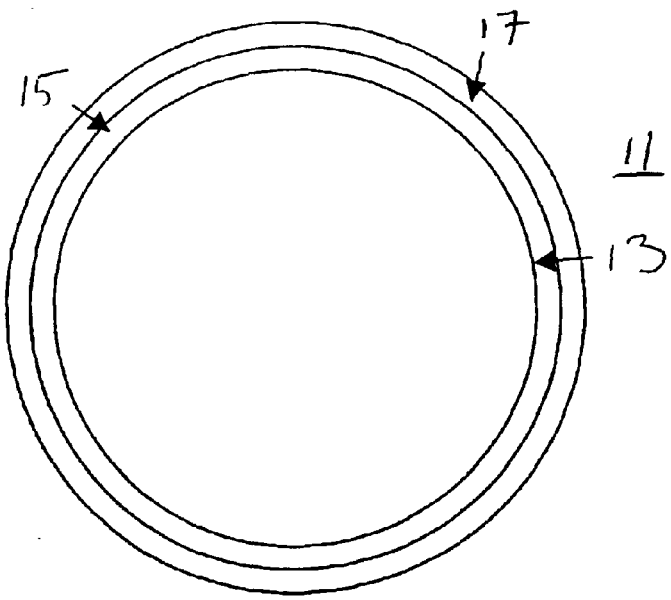
FIG. 2 is a cross-section illustration of an alternative embodiment of the insulating jacket of the present invention.

In the event that the vessel 13 is a condenser or discharge pipe, both of which are relatively high temperature (typically greater than 90° F.), there exists no need to use the closed cell thermal insulation layer 19. With reference to FIG. 2, there is illustrated the instance wherein the vessel 13 comprises a condenser. As is illustrated, vessel 13 is surrounded by an open cell foam layer 15 which is itself surrounded by a sound barrier layer 17. In such an instance, the combination of the open cell foam layer 15 and the sound barrier layer 17 is sufficient to achieve the goal of the present invention. In addition, in such a configuration, there does not exist a need to glue the open cell foam layer 15 to the vessel 13. In addition, a layer of aluminized vinyl fiberglass cloth may be glued to the outer surface of the sound barrier layer 17 for protecting the jacket 11 from adverse weather (rain, dust) and wear due to transportation. Preferable materials for the sound barrier layer 17 include barium sulfate, PVC or barium sulfate may be used for the open or closed cell foam, and aluminized vinyl fiberglass cloth may be used as a surrounding weatherproof layer.

In typical operation, the sound and thermal treatment comprising the sound jacket 11 of the present invention is applied along the length of a vessel 13. A typical vessel 13, cooler or condenser, is approximately 48 inches in diameter and approximately 12 feet long. The sound jacket 11 of the present invention can be constructed in a multitude of sections, preferably three or four sections, and subsequently applied to the vessel 13. In instances when the sound jacket 11 of the present invention is not glued to the vessel 13, it is often times preferable to utilize velcro straps to tightly fit the sound jacket 11 to the vessel 13.

With reference to FIG. 3, there is illustrated a graph 31 depicting the diminution in acoustic transmittal as a function of compressor speed. As depicted, line 33 corresponds to the sound transmitted in the absence of a sound jacket 11 while line 35 corresponds to the sound transmitted when using the sound jacket 11 of the present invention.

Figure 4A:
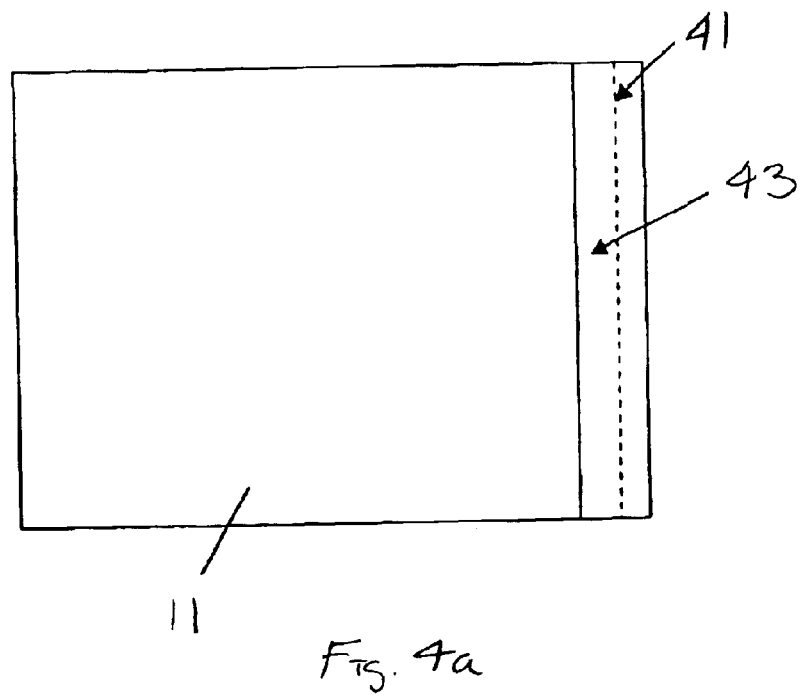
FIG. 4a is an illustration of the velcro attachment to the sound jacket of the present invention.
Figure 4B:
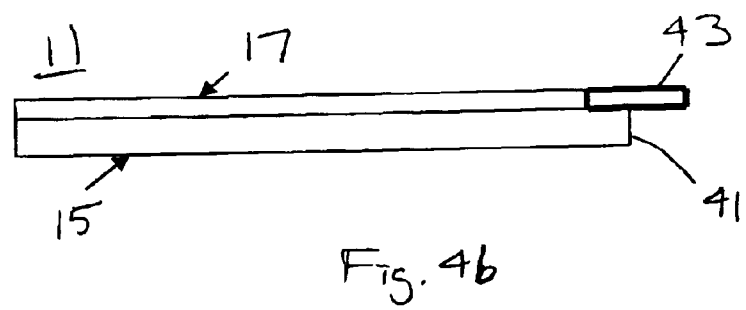
FIG. 4b is an illustration of the velcro attachment to the sound jacket of the present invention shown on edge.
Figure 4C:
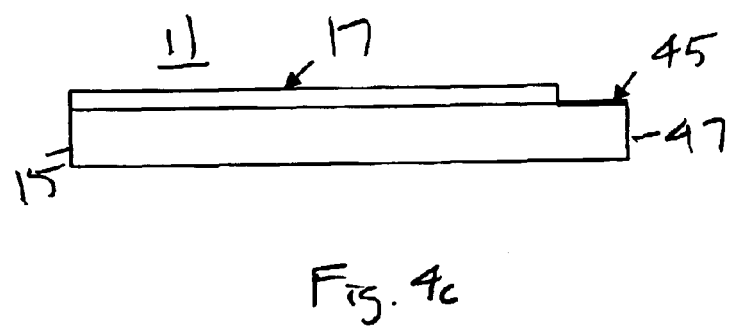
FIG. 4c is an illustration of the mating velcro attachment of the present invention.

With reference to FIG. 4a, there is illustrated a sound jacket 11 showing the manner in which a velcro strap 43 may be attached. Sound jacket 11 is illustrated in generally rectangular form so as to be rollable into a generally cylindrical shape. Along one edge 41 of sound jacket 11 there is attached velcro strap 43 extending generally parallel to edge 41. With reference to FIG. 4b, there is shown sound jacket 11 to which is attached velcro strap 43 as viewed along an edge of sound jacket 11. In a preferred embodiment illustrated, velcro strap 43 fits flush and in contact with sound barrier 17 while overhanging open cell foam layer 15. With reference to FIG. 4c, there is illustrated an opposing edge 47 of sound jacket 11 wherein a mating velcro portion 45 is attached to sound jacket 11. Mating velcro portion 45 is attached to open cell foam layer 15 and abuts sound barrier 17. When sound jacket 11 is rolled to form a cylindrical shape, the overhanging portion of velcro strap 43 can be attached to mating velcro portion 45.

It is apparent that there has been provided in accordance with the present invention an insulated sound jacket for reducing noise transmission in refrigerator components. While the present invention has been described in the context of specific embodiments thereof, other alternatives, modifications, and variations will become apparent to those skilled in the art having read the foregoing description. Accordingly, it is intended to embrace those alternatives, modifications, and variations as fall within the broad scope of the appended claims.

What is claimed is:

1. An insulating jacket for refrigeration system component, comprising:
    a closed cell insulation layer comprising an inner and outer surface;
    an open cell foam layer comprising an inner and outer surface, said inner surface in contact with said outer surface of said closed cell insulation layer; and
    a sound barrier layer comprising an inner surface in contact with said outer surface of said open cell foam layer.

2. The insulating jacket of claim 1, wherein said inner surface of said closed cell insulation layer is in contact with a vessel.

3. The insulating jacket of claim 2, wherein said vessel is selected from the group consisting of a cooler and an economizer.

4. The insulating jacket of claim 1, wherein said outer surface of said open cell foam layer is glued to said inner surface of said sound barrier.

5. The insulating jacket of claim 2, wherein said inner surface of said closed cell insulation layer is glued to said vessel.

6. The insulating jacket of claim 2, wherein said inner surface of said closed cell insulation layer is attached to said vessel via velcro straps.

7. The insulating jacket of claim 1, wherein said closed cell insulation layer, said open cell foam layer, and said sound barrier layer comprise generally cylindrical sheaths.

8. The insulating jacket of claim 1, wherein said closed cell insulation layer and said open cell foam layer are comprised of a material selected from the group consisting of PVC and nitrile.

9. The insulating jacket of claim 1, wherein said sound barrier layer is comprised of barium sulfate.

10. The insulating jacket of claim 1, additionally comprising a weatherproof layer comprised of aluminized vinyl fiberglass cloth.

* * * * *